(12) United States Patent
Heylen

(10) Patent No.: US 6,560,176 B1
(45) Date of Patent: May 6, 2003

(54) METHOD AND APPARATUS FOR DETERMINING THE PROVENANCE OF A DATA CARRYING DISC

(75) Inventor: Richard A. A. Heylen, Leeds (GB)

(73) Assignee: Macrovision Europe Limited, Woodley (GB)

(*) Notice: Subject to any disclaimer, the term of this patent is extended or adjusted under 35 U.S.C. 154(b) by 0 days.

(21) Appl. No.: 09/582,827

(22) PCT Filed: Dec. 22, 1998

(86) PCT No.: PCT/GB98/03878

§ 371 (c)(1),
(2), (4) Date: Jun. 29, 2000

(87) PCT Pub. No.: WO99/35641

PCT Pub. Date: Jul. 15, 1999

(30) Foreign Application Priority Data

Dec. 30, 1997 (GB) .............................................. 9727461
Jan. 20, 1998 (GB) .............................................. 9801235

(51) Int. Cl.$^7$ ................................................ G11B 7/00
(52) U.S. Cl. ................... 369/53.1; 369/53.21; 369/47.1
(58) Field of Search ............................ 369/47.1, 47.12, 369/47.14, 47.46, 53.1, 53.11, 53.16, 53.21, 53.31, 53.45, 59.1

(56) References Cited

U.S. PATENT DOCUMENTS 5,703,858 A * 12/1997 Mitchell et al. ......... 369/53.21
5,812,501 A * 9/1998 Moribe et al. .......... 369/53.22

* cited by examiner

Primary Examiner—Muhammad Edun
(74) Attorney, Agent, or Firm—Frank Nguyen

(57) ABSTRACT

The method and apparatus of the invention utilize the fact that CDs manufactured from the same master will have distinctive physical characteristics attributable to the physical manufacturing process of the master to distinguish counterfeit CDs from genuine discs. For a genuine disc (4), the relative angular orientation of specified sections (1, 2, 3) of the recorded data are determined and recorded. The relative angular orientation of the same sections (1, 2, 3) of data on a test disc (5) are also determined. Where the relative angular orientations are the same it is concluded that the test disc derives from the same source as the genuine disc and is therefore bona fide. Where there is no correlation, the test disc may be identified as counterfeit. The relative angular orientations, or other physical characteristics of the discs, may be physically measured, or may be calculated from information gained by reading the data on the disc.

38 Claims, 6 Drawing Sheets

Figure 1:
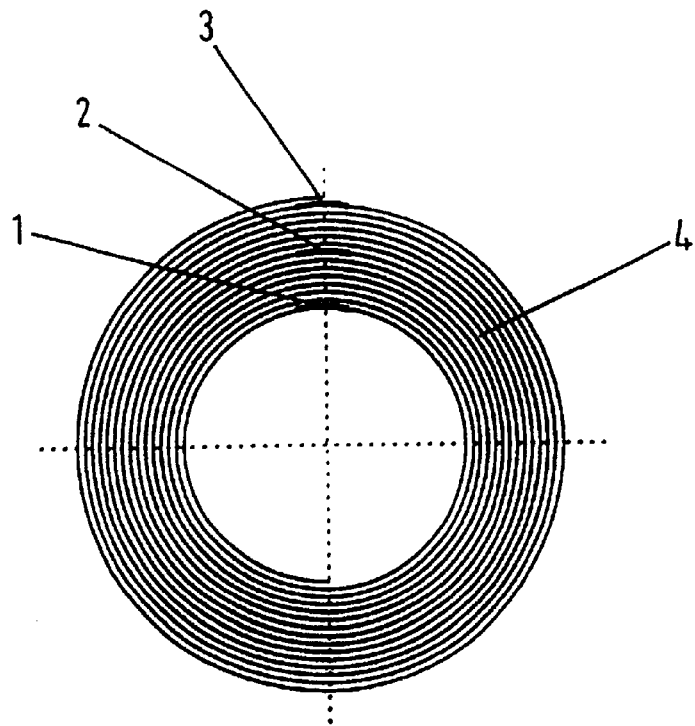

| Frame Number (1 to 10) | Frame Position (Time: mm:ss:ff) | Relative Angular Orientation (degrees) |
|---|---|---|
| 1 | 00:00:00 | 0° |
| 2 | 03:59:46 | 210° |
| 3 | 08:26:62 | 109° |
| 4 | 13:21:49 | 321° |
| 5 | 18:44:08 | 98° |
| 6 | 24:34:12 | 192° |
| 7 | 30:51:61 | 271° |
| 8 | 37:37:08 | 352° |
| 9 | 44:50:06 | 8° |
| 10 | 52:30:38 | 102° |

METHOD AND APPARATUS FOR DETERMINING THE PROVENANCE OF A DATA CARRYING DISC

The present invention relates to methods and apparatus for determining the provenance of data carrying discs, such as compact discs (CD).

The CD is a read only storage medium. Originally, CDs were used for the storage of music and other audio data. However, formats, such as the CD-ROM format, have been developed facilitating the reliable storage of data for use by computers and other digital devices. The CD-ROM format has become very popular and has become the mass data storage medium for computer programs and other files.

CDs can store about 74 minutes of high quality stereo sound or about 650 megabytes of data or some combination of both. The value of a CD to the end user, because of the value of the data it stores, is typically much more than its physical cost. This has made it an attractive target for counterfeiters who can produce replicas of an original CD at a nominal cost and sell the replicas, at the market price for the data, to make large profits.

With distribution media such as audio tapes or video cassettes, the quality of counterfeit copies tends to be lower than that of the originals due to the corruption of the analogue signal in the copying process. There is no such degradation in the case of CDs, however, as all of the information is stored digitally. Counterfeiters can therefore produce counterfeit copies of CDs which are almost indistinguishable from original or bona fide CDs.

If it were possible to distinguish between an original or bona fide CD and a counterfeit, then the problems caused by counterfeiters could be substantially reduced. Law enforcement officials, for example, would have a means of identifying counterfeit CDs, and could more easily obtain search warrants and secure prosecutions. If a CD carries a program, that program could be used to check that it was loaded from a bona fide, original CD.

The present invention seeks to identify counterfeit CDs and other data carrying discs.

According to a first aspect of the present invention there is provided a method of determining the provenance of a data carrying disc, the method comprising the steps of determining physical characteristics of selected data recorded on a test disc, comparing the physical characteristics determined with the physical characteristics of the same data on a data carrying disc produced from a known source to determine whether the test disc has been produced from the known source.

The manufacturing process for a data carrying disc, such as a CD, begins with the production of a master, and in the physical manufacturing process of the master, variations are introduced which give the master distinctive physical characteristics and cause errors in the data. The master is used to form generations of discs, and the physical characteristics of the master are passed on, down the generations. A group of discs manufactured from the same source, therefore, consistenty exhibit the physical characteristics of the master, and those physical characteristics can be used as a "fingerprint" for, or identification of, that source.

This invention has relevance to all data carrying discs, such as CDs and DVDs (digital versatile discs) and other optical discs, where physical characteristics arising out of the physical manufacturing process, are consistently reproduced in all discs originating from the same source.

Thus, in a method of the invention, the physical characteristics determined arise from the physical manufacturing process and act as a fingerprint for a particular known source in the manufacturing process.

An embodiment of a method of the invention may be used to identify that a test is genuine when the physical characteristics determined from the test disc correlate with the physical characteristics of the same data from a known and genuine source. Similarly, the absence of correlation between the physical characteristics may be used to identify a counterfeit disc.

CDs carrying popular music or computer programs, for example, may originate from a number of masters from manufacturing plants in different countries. What is more, the or each master will not be used to directly form the CDs. Each master is used in the production of a number of stampers which are used to produce the discs sold in the marketplace. It will, therefore, be appreciated that although the fingerprint of one master will be apparent in its progeny, each stage of the process will also introduce fingerprints from the sources used in those stages.

The physical characteristics determined may be chosen as appropriate. In an embodiment, the physical characteristics determined are the locations of selected data on the disc.

For example, the physical characteristics may be the total length of the data carrying spiral track, or the radial positioning of specified sections of data. In one embodiment, the physical characteristics determined are angular orientations of specified sections of the data recorded on the disc. The angular orientations determined may be absolute or relative.

In a presently preferred embodiment, the specified sections of the data recorded on a data carrying disc from a known source lie substantially on a single radius of the disc.

The selected data whose physical characteristics are determined may be dedicated data sections. For example, the dedicated data sections may be introduced during manufacture along a radius of a master to provide copy protection for the discs made therefrom.

However, it is generally preferred to determine physical characteristics of selected, identifiable sections of the data on the disc as this enables the techniques described herein to be used to determine the provenance of existing discs.

In an embodiment, the selected data whose physical characteristics are determined are selected frames of the data recorded on the disc.

Preferably, the selected frames of data are at evenly spaced radial positions on a data carrying disc from a known source.

In an embodiment, the method further comprises the steps of extracting selected data from a test disc and determining the physical characteristics thereof, and at substantially the same time extracting the selected data from a disc from a known source and determining the physical characteristics thereof, whereby the comparing step is performed in real time.

For example, each of a test disc, whose provenance is to be determined, and a genuine disc from a known source are read in a respective disc reader and the determined information output from each reader is fed, for example, to processing means to enable the comparison to be undertaken.

Additionally and/or alternatively, the method may further comprise the steps of extracting selected data from a disc from a known source and determining the physical characteristics thereof, and recording the physical characteristics determined as a fingerprint of the known source.

There are different ways in which a method of the invention as defined above may be implemented. For example, measurements may be taken to determine the physical characteristics and to thereby enable the comparison. This would be an implementation in hardware.

Alternatively, data extracted from a disc can be processed to reveal information as to its location on the disc, for example, whereby physical characteristics thereof are determined. This would be an implementation in software.

Of course, an implementation which combines the two approaches would also be possible.

The present invention also extends to apparatus for determining the provenance of a data carrying disc by a method as defined above.

According to a further aspect of the present invention there is provided apparatus for enabling the provenance of a data carrying disc to be determined, said apparatus comprising means for determining physical characteristics of selected data recorded on a test disc, and means enabling the comparison of said physical characteristics determined with the physical characteristics of the same data on a data carrying disc produced from a known source.

Said means for enabling the comparison of physical characteristics may comprise a chart, table, graph or other hard copy representation of the physical characteristics of the selected data on a genuine disc. A similar representation of the physical characteristics determined for a test disc may then be displayed and/or printed and the comparison made by eye.

Preferably, however, said means enabling said comparison comprises processing means.

In one embodiment, said means for determining said physical characteristics of a test disc comprise means for rotating a test disc, sensor means for generating pulses representative of the angular orientation of the test disc, a pickup for extracting data from the rotating test disc, and circuit means for obtaining timing information from the extracted data.

It is possible to provide dedicated apparatus incorporating the features described above. However, it is generally preferred to modify a substantially conventional disc reader and a substantially conventional data extraction circuit to provide the data required for the comparison.

In the embodiments described above, the physical characteristics are determined by direct measurements. Additionally and/or alternatively it is possible to process the data on the disc to reveal information about the physical characteristics of the disc.

In a preferred embodiment, said means for determining said physical characteristics of a test disc comprise means for rotating a test disc, a pickup for extracting data from the rotating test disc, and circuit means for determining the location of the data extracted on the test disc.

Figure 2:
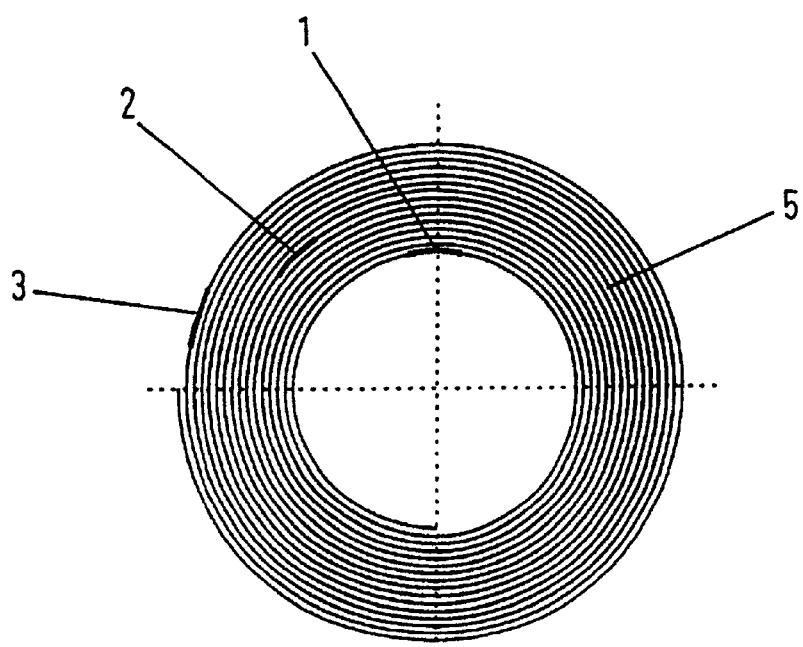
Figure 3:
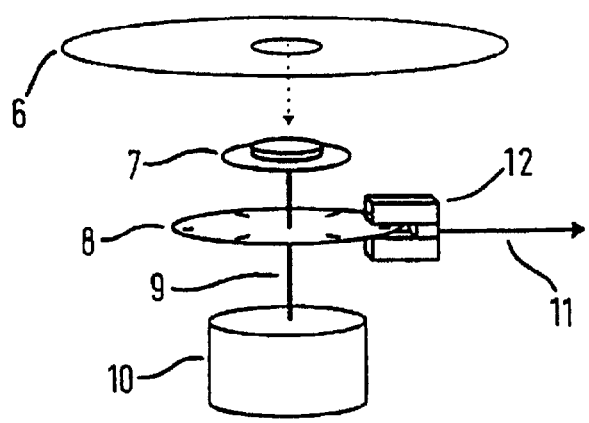
Figure 4:
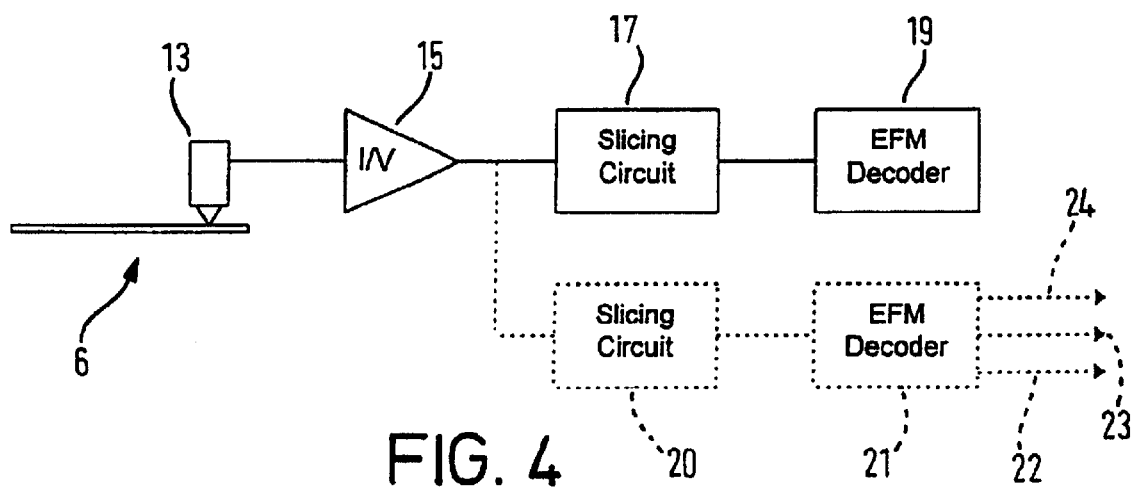
Figures 5, 6:
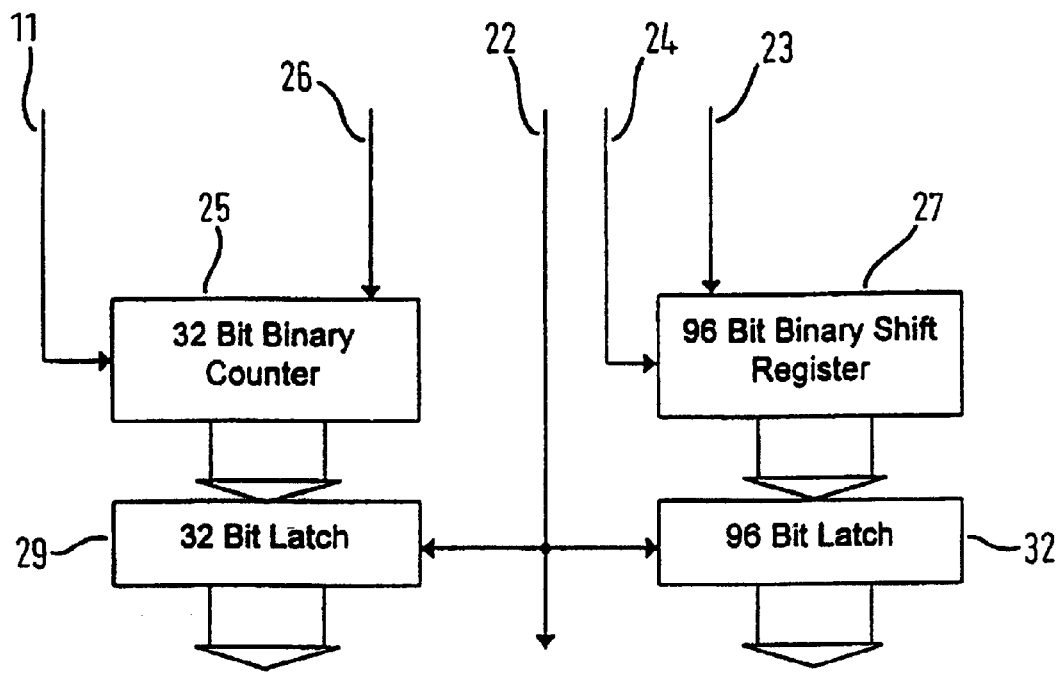
Figure 7:
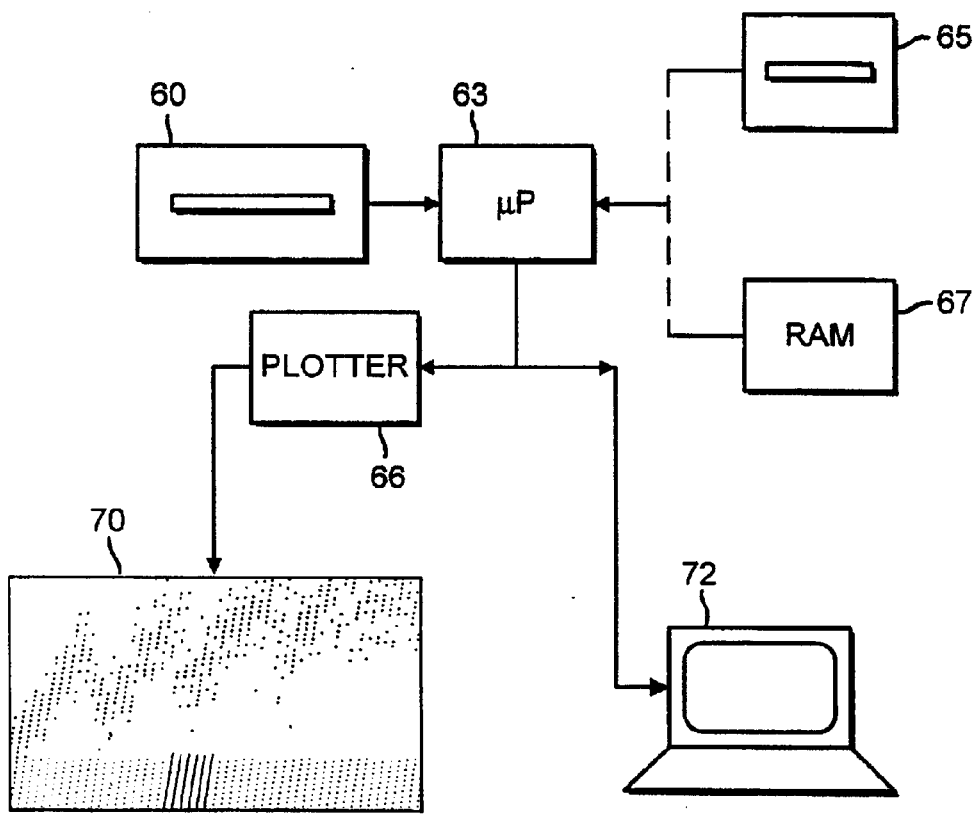
Figure 8:
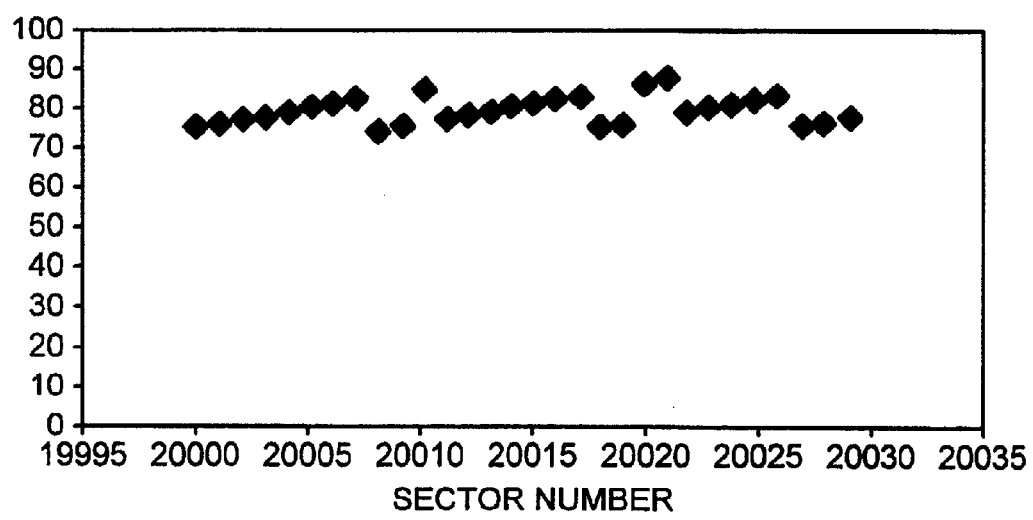
Figure 9:
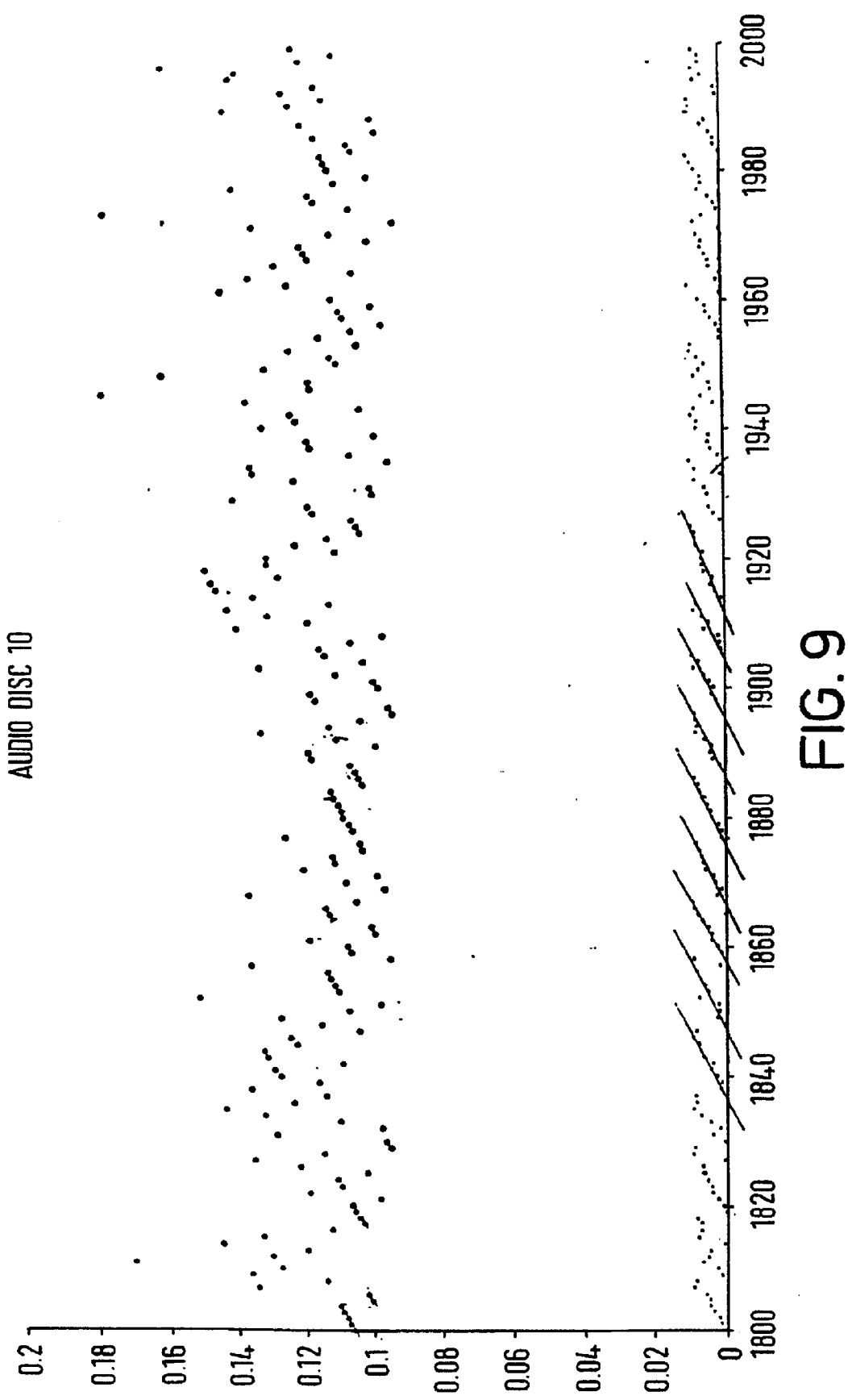
Figure 10:
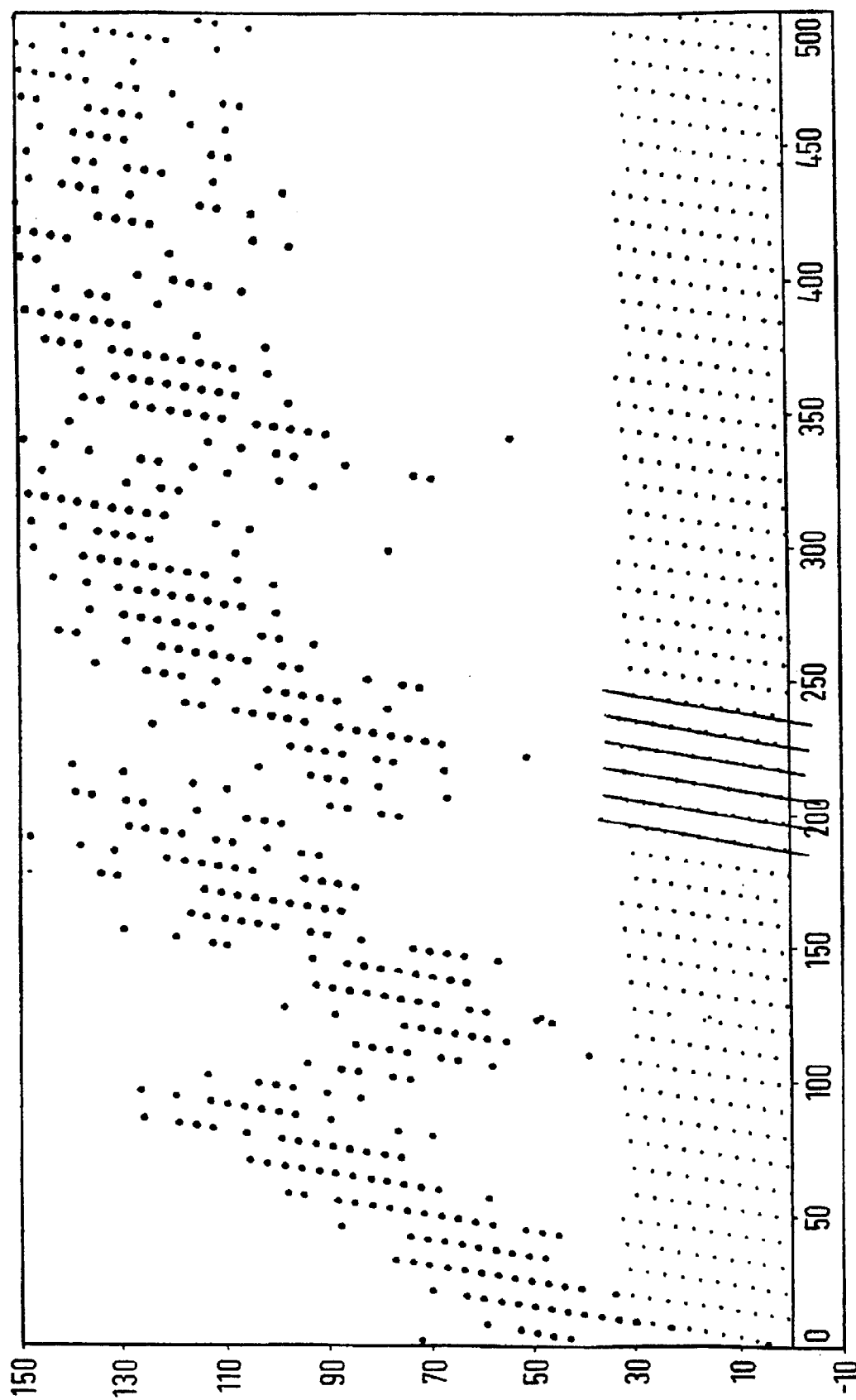

Embodiments of the present invention will hereinafter be described, by way of example, with reference to the accompanying drawings, in which:

FIG. 1 shows a CD produced from a first master,

FIG. 2 shows a CD carrying identical digital data to the CD of FIG. 1 but originating from a different master, FIG. 3 shows schematically a substantially conventional apparatus for rotating a CD which has been modified to enable measurement of angular orientation, FIG. 4 shows schematically the data extraction circuit of a CD player with modifications to enable data areas on the CD to be extracted, FIG. 5 shows a signal processing circuit for processing signals obtained from the circuits of FIGS. 3 and 4, FIG. 6 illustrates a fingerprint for a CD determined using the circuits of FIGS. 3 to 5, FIG. 7 shows schematically a further embodiment of apparatus for authenticating a CD, FIG. 8 shows an idealised example of a graphical output obtained from an apparatus as in FIG. 7, FIGS. 9 and 10 are examples of print outs obtained from use of apparatus as shown in FIG. 7.

As is made clear above, the present invention can be used for any data carrying discs where physical characteristics of the discs arising out of the physical manufacturing process will be consistent for all discs originating from the same source. However, for simplicity the present invention is described herein with specific reference to CDs.

As is well known, a CD originates from a glass master which is cut by a laser whilst the disc is rotated on a mandrel. The laser beam intensity is modulated by the data to be recorded. Each master is used to make nickel copies which are used to make stampers. Commercial CDs are manufactured using these stampers. Every master is physically unique, and its physical characteristics result from imperfections in the glass substrate or photoresist coating, and arise out of variations, for example, in the speed of rotation of the mandrel and from the movement of the laser. These physical characteristics produce a fingerprint which is inherent to the master. Similarly, as the generations of copies to produce the stamper and then the CD discs are made directly and then indirectly from the master, additional unique fingerprints will be superimposed on each generation copy. These fingerprints are physical characteristics which are passed on to successive generations of copies. Of course, each generation, because of the manufacturing process used to produce it, has its own set of physical characteristics or its own fingerprint. Thus, every CD has superimposed fingerprints, one of which can be attributed to each of its ancestors.

With methods and apparatus of the invention, physical characteristics of a master or of a disc from a known source, such as a known stamper, are determined and are used as a fingerprint of that master or stamper. This fingerprint can be compared with the physical characteristics of a disc under test to determine whether or not the test disc has the same master or stamper as an ancestor.

To further explain the specific embodiments of the present invention it is useful to look briefly at the data format of a CD.

Data is recorded on CDs according to the International Standard ISO/IEC 10149. The data is present on the CD as a sequence of pits of varying length in the reflective material of a CD. These pits lie on a tight spiral which runs continuously from near the centre of the reflective portion to near the outside of the reflective portion of a CD. A CD reader uses a laser to scan along the spiral and it detects the edges of the pits by measuring the reflectivity of the disc as it scans. The presence of a pit causes less of the light to be reflected back.

The pits represent binary bits of information. A data byte comprises 8 binary bits and a large number of these data bytes are grouped together in sectors along the spiral track.

The laser produces a beam of light which is reflected from the disc for its intensity to be measured with a photodetector. The photodetector produces an analogue signal which can be identified with the reflectivity of the disc along the spiral. The signal is amplified and converted to produce a stream of zero bits with a set bit for every edge detected. This is called the EFM (eight to fourteen modulation) stream and is the first digital signal from the disc.

The EFM stream is divided into blocks separated by a 24 bit synchronisation pattern. The synchronisation pattern is followed by three "merging" bits and then 33 lots of 14 bit words each followed by three "merging" bits. The 14 bit words are passed through a EFM demodulator (for example, a look-up table) which translates the words into 8 bit bytes. Each EFM block separated by the 24 bit synchronisation pattern therefore translates into a "frame" of 33 bytes. One byte of every frame is used for the "subcode" and the remaining 32 bytes are passed to C1 and C2 decoders which apply error correction.

Error corrected data comes out of the decoders in 24 byte blocks. These blocks are assembled sequentially, 98 at a time, into 2352 byte sectors. These 2352 bytes encode audio data but computer data has another layer of error correction on top, leaving 2048 bytes of user data. The subcode bytes are assembled vertically 98 at a time into subcode blocks. The first two subcode bytes are synchronization bytes and the rest of the bytes are divided into the P, Q, R, S, T, U, V and W subchannels. The P-subchannel consists of the high order bit of the 96 non-synchronisation subcode bytes. The Q-subchannel block is made from the second highest order bit of the same bytes and so on.

The first four bytes of the Q-subchannel block are the "control" field, the second four make up the "ADR" field. 72 DATA-Q bits then follow, the interpretation of which depends on the value of the ADR field. There then follows a 16 bit CRC on the three previous fields. The CRC detects errors but does not correct them.

There are very nearly the same number of Q-subchannel blocks as there are sectors on a CD. It may appear from the description that Q-subchannel blocks correspond to sectors on a one to one basis; but this is not quite true as the C1 and C2 decoders delay some bytes for the purposes of coping with burst errors.

Normally the Q-subchannel blocks are used by the drive of a CD reader to navigate around the CD. When the "ADR" field contains "0001" the DATA-Q bits encode the position of the block in the track from the start of the disc. Each Q-subchannel block therefore has a unique address which increases monotonically.

The Q-subchannel block can be used to record other information such as the UPC/EAN which is effectively a bar code or an ISRC as defined in DIN-31-621. These Q-subchannel blocks do not contain much position data and hence are not so useful for navigating around the drive. They are placed at regular but fairly large intervals in the Q-subchannel so as not to interfere with the CD drive's navigation requirements.

Generally, during the manufacture of a master the track pitch and linear velocity are very closely controlled at constant values by servo systems, although no mastering system will provide zero deviation from the controlled values. Thus, two masters containing identical digital data will have physical differences in the total length of the spiral of information pits, the angular orientation of separate data areas relative to one another, and the radial positioning of the data. There will also be variations in the positions, both radial and angular, of sectors in which data is grouped, and in the positions of any markers on the CD.

An example of the differences in the physical characteristics is shown in FIGS. 1 and 2. FIG. 1 shows a CD 4 which has been pressed from one master. The relative angular orientations of three identifiable data areas are indicated as 1, 2 and 3. In FIG. 2 CD 5 contains exactly the same digital data as CD 4 but has been pressed from a different master from CD 4. The relative angular orientations of the same three identifiable data areas 1, 2 and 3 on CD 5 are in general different from those on CD 4 because of variations in track pitch and linear velocity inherent during the mastering process, as described above.

An example of an embodiment of the invention is illustrated in FIGS. 3 to 5. In this embodiment, it is the relative angular orientations of data on a CD which is the physical characteristic determined.

FIG. 3 shows schematically a substantially conventional apparatus for rotating a CD, for example as provided in a CD player or CD-ROM drive which has been modified to enable the measurement of relative angular orientation. As shown in FIG. 3, a CD 6 is held firmly in place by a locating device 7 mounted on the shaft 9 of a spindle motor 10. The modification to enable the measurement of relative angular orientation comprises the addition of an incremental shaft encoder 8, which is mounted on the shaft 9, and the provision of a pick up device 12 to pick up pulses generated by the encoder 8. In a case where the housing itself of the motor 10 rotates, the encoder 8 would be mounted on the motor housing.

It would be possible to utilise an incremental shaft encoder 8 arranged to generate absolute index pulses. However, in the illustrated embodiment, and for simplicity, the shaft encoder 8 is arranged to generate incremental pulses and, reliance is placed on error-free storage of the cumulative count in a counter 25 (FIG. 5). The pickup device 12 and its associated electronics produce an angular position signal 11 which is in the form of a fixed number of discrete pulses per revolution of the shaft 9. In this embodiment, the encoder 8 is an incremental shaft encoder which produces 360 or more pulses per revolution, and thereby gives an angular resolution of 1 degree of arc or less.

FIG. 4 shows an example of a substantially conventional data extraction circuit of a CD player or CD-ROM drive which has been modified to enable signals to be extracted which identify data areas on the CD. In FIG. 4, for clarity, the parts of the data extraction circuit, which is arranged to retrieve digital information from a CD, are indicated in a simplified form. As indicated in FIG. 4, a CD 6 is arranged to be rotated adjacent to a servo-controlled laser pickup device 13 which automatically tracks the spiral digital data stream on the CD. The laser pickup device 13, which incorporates a photodetector, produces a current output which is proportional to the light reflected from the CD, and this current output is converted to a voltage by a current to voltage converter 15. The resulting output voltage of the converter 15 is commonly referred to as the 'HF' (High Frequency) signal and is an analogue representation of the digital data stream on the optical disc. The HF signal is converted to produce the EFM digital data stream by a slicing circuit 17. The slicing circuit 17 comprises a voltage comparator circuit where the reference voltage is controlled such that the ratio of logical 1 to logical 0 output pulses is 1:1. The resulting EFM digital data stream is then decoded into main and subcode data channels by the EFM decoder 19.

The main data channel comprises digital information which, for CDs containing digital audio data, is output at a rate of 176,400 8-bit bytes every second. As described above, these bytes are grouped into sectors of 2,352 bytes, output at a rate of 75 frames per second. Embedded in parallel with the main data channel is the subcode data channel which contains timing and other information. This is grouped into the subcode blocks. The 96 non-synchronisation subcode bytes are output in parallel at a rate of one bit of each of the 8 subcode bytes simultaneously as an 8-bit byte for every 24 bytes of main data channel data. Consequently the 8 subcode bytes are output to completely at a rate of 75 times per second, with the main timing information located in the second, Q-subchannel block. This timing information includes an indication of the absolute location of the main data channel in the format of minutes: seconds: frames, thereby locating the main data channel to a resolution of 1/75th of a second, or 2,352 bytes. This time count, which starts from 00:00:00 at the start of the data area on the CD, is commonly referred to as 'absolute time' or 'A-time', and is used by CD players and CD-ROM drives to navigate the disc during playback.

The substantially conventional data extraction circuit is, as is shown in FIG. 4, modified by the addition of further components which are shown in dotted lines. These further components comprise a second slicing circuit 20 and a second EFM decoder 21. The HF signal output from the current to voltage converter 15 is also applied to the second slicing circuit 20. Three outputs comprising the Q-subchannel signal 23, the Q-subchannel sync signal 22, and the Q-subchannel clock signal 24 are extracted from the second EFM decoder 21. The Q-subchannel signal 23 comprises a 96-bit digital code which is output serially from the second EFM Decoder 21 as described above. This 96-bit digital code is clocked out such that it is complete at intervals of 1/75th of a second during playback. The start of this signal is indicated by the Q-subchannel sync signal as a pulse output at intervals of 1/75 of a second during playback. The Q-subchannel clock signal 24 is output at the rate of one state transition from logical 0 to logical 1 at every bit cell of the subcode data channel.

The use of the additional components 20 and 21 enables any commercially available CD player or CD-ROM drive from which the HF signal can be extracted to be modified for use in a method of the invention. This is preferred because it is not always possible to extract the Q-subchannel signal, the Q-subchannel sync signal and the Q-subchannel clock signal from commercially available CD players or CD-ROM drives. Even where it is possible to extract these signals, the timing delays of the digital data stream in different manufacturers' EFM decoder devices 19 are not necessarily identical.

FIG. 5 illustrates an embodiment of a circuit for processing the signals extracted from a modified CD player or CD-ROM drive to provide an indication of the relative angular orientation of identifiable data areas of a CD. The circuit of FIG. 5 acts to latch the angular position signal 11 (FIG. 3) and the Q-subchannel signal 23 synchronous with the Q-subchannel sync signal 22. The angular position signal 11 is applied to, and is arranged to increment a 32-bit binary counter 25 as the shaft 9 rotates. The output of the 32-bit counter count output may be reset to 00000000 (hexadecimal) by applying a counter reset signal 26. The output of the counter 25 is fed to a 32-bit latch 29 such that the value of the counter count is latched by the Q-subchannel sync signal 22.

The Q-subchannel signal 23 is a 96-bit serial bit stream which is clocked into a 96-bit binary shift register 27 by the Q-subchannel clock signal 24. The output of the 96-bit shift register 27 is fed to a 96 bit latch 32 such that the value of the Q-subchannel bit stream is latched by the Q-subchannel sync signal 22. In this manner the output values of both of the 32-bit latch 29 and of the 96-bit shift register 32 are latched synchronously with the Q-subchannel sync signal 22. It will be appreciated that the output of the latch 29 will be a count representative of angular position, whereas the output of the shift register 32 is the value of the Q-subchannel.

The values of the count from the latch 29, of the Q-subchannel, and of the Q-subchannel sync signal 22 are fed to a computer to enable the relative angular orientation of main channel data areas on the CD identified by the Q-subchannel to be determined. One method for making this determination involves:

1. Start the compact disc playing.
2. Reset the 32-bit counter 25 using the reset signal 26.
3. Monitor the Q-subchannel sync signal 22 to observe a state transition change from logical one to logical zero, which indicates that a fresh 96-bit Q-subchannel signal 23 has been completely serially-shifted into the 96-bit shift register 27.
4. Read the latched output values of the latch 29 and the latch 32.
5. To continue the process repeat from step 3.

It is possible to produce a fingerprint of a CD by using the technique described above to determine, for example, the relative angular orientations of 10 specific frames, each of duration 1/75th of a second, and the frames being at evenly spaced radii on the CD. The procedure for this can be performed automatically by a computer controlled CD player or CD-ROM drive and is listed hereafter in a form suitable for realisation in software:

1. Read the Table of Contents from the CD in order to determine the length of the data area. This is a standard procedure performed by all CD players and CD-ROM drives prior to accessing the main channel data on the CD. From this information calculate the absolute time values of 10 frame positions on the CD (1 frame is a main channel data segment of duration 1/75th of a second).
2. Start the CD playing, then reset the 32-bit counter 25.
3. Play the CD at a point five or more frames earlier than the first frame position calculated at stage 1.
4. Record the Q-subchannel value and the count representative of the relative angular position for all frames from the point five or more frames earlier than the first frame position calculated at step 1 to a point five or more frames later than the first frame position calculated at step 1. From the resulting recorded sequence of Q-subchannel values and count values of the relative angular positions, the location of the frame position of the first frame position calculated at step 1 can be determined either directly or by interpolation. The use of an interpolation technique enables CDs to be read where there are data errors corrupting the Q-subchannel data, as is commonly the case.
5. Repeat steps 3 and 4 for the remaining nine frame positions calculated at step 1.
6. Construct a fingerprint for the CD by normalising the ten recorded relative angular positions to the first and calculating the resulting angular orientations. The fingerprint then takes the form illustrated in FIG. 6.

FIG. 6 shows an example of a fingerprint for a CD. The first column 34 lists the ten data areas. The second column 35 lists the ten chosen frame positions in the A-time format of minutes:seconds:frames. The third column 36 lists the relative angular orientations of those ten frame positions. An authentic CD would have a fingerprint such that its ten angular positions 36 correlate very closely to those of its master or stamper.

Thus, the position of specific sections of the data stream of a master or of a known genuine disc may be measured to provide an authentification fingerprint. That authentification fingerprint may be stored, for example, in a suitable memory or storage device and/or may be recorded on paper or in other hard copy format. The measurement may be carried out using apparatus as described above. Then, at any time in the future, if it is desired to authenticate a disc which is believed to have been produced from that master, apparatus as described above may again be used to obtain the fingerprint of the corresponding sections of data stream on the test disc. The authentification fingerprint and the resulting fingerprint from the test disc are then compared to determine whether there is close correlation.

If the fingerprint data is stored electronically, such correlation may be carried out by suitable data processing apparatus. If the fingerprints are reduced to paper or other hard copy form, human input will be required. The latter may be advantageous when, for example, fingerprints of masters are stored at one location (for example, kept with the original manufacturer), whilst the fingerprints of discs under test replicas are obtained elsewhere, (for example, by police or customs authorities). The comparison of the fingerprints enables the test disc to be authenticated.

In the embodiment discussed above, the physical characteristics of the discs are determined by physical measurement of the discs. However, it is alternatively possible to determine physical characteristics by calculation, and/or by processing data obtained from the discs and/or by other software methods.

FIG. 7 shows schematically a further embodiment of apparatus for authenticating a test disc. The apparatus comprises a CD reader 60 connected to a processor 63. A second CD reader 65 is connected to the processor 63. Alternatively a data store 67 is connected to the processor 63. The CD reader 65 or data store 67 supplies data signals obtained from a master or from a known source. The data store 67 may be standard Random Access Memory (RAM), a hard disc, EEPROM or any other recordable medium. The processor 63 compares corresponding sector or marker position information from the source disc and from the disc under test and produces a graphical output on a print-out 70 from a plotter 66 or sends a signal to a display 72. FIGS. 8, 9 and 10 show examples of the outputs which may arise.

The position of sectors or markers on a CD is calculated by measuring the time taken to read the sector, immediately after reading a reference sector or other datum such as the Table of Contents (TOC). That is, the drive of a conventional CD reader is forced to seek from a particular reference point to a sector of interest. The total time taken to read the sector is taken as representative of the position of the sector header. FIG. 7 illustrates how the time taken to read a number of consecutive sectors from a disc under test may be displayed as a graph 70 by the plotter 66. The laser pickup (not shown) of the CD reader is returned to a reference sector before each sector measurement is taken.

After processing, timing data derived from consecutive sectors or markers describes a characteristic saw tooth pattern as shown diagramatically in FIG. 8. In this respect, sectors are arranged sequentially in tracks. Ideally, the time taken to read consecutive sectors, where the laser pickup commences each time from a common reference sector, tends to increase for each sector on a particular track, and then decreases again for the first sector on the next track. This is because the time taken for the laser pickup to move along a physical track in a CD is more significant the time taken for radial movement of the pickup across the CDs surface when the pickup moves to another track. However, from FIG. 8 this does not appear to be the case for sectors 20010, 20021 and 20022. In these cases linearity with adjacent sectors appears to be lost. This may be due to the laser pickup failing to read a sector at a first attempt Consequently the CD must complete another revolution before the laser pickup is able to read the sector again. In practice this may happen any number of times. Timing data, however, may be normalised by removing multiples of the rotation time so as to obtain linearity. This modulus operation eliminates any apparent discontinuity and also ensures that the method of obtaining data is independent of the type of CD reader. Thus following a normalisation operation, sectors that intersect the x-axis are all shown to lie on the same radius of a CD. Of course, none of the sectors has to lie on exactly the same radius. Accuracy to a fraction of a sector is obtained by fitting a line to the points and extrapolating to the x axis as indicated in FIG. 10.

As discussed above, sectors that lie on any given radius will always be the same for CDs generated from the same master as shown, for example, in FIG. 1. However, if the same sectors are examined on a disc from a different source, they will not lie on a radius as indicated in FIG. 2. Rather the same sectors on a disc from a different source with exhibit non-linearity or spiral skew as shown in FIG. 2. Thus, these physical differences may be used to determine if a test disc has been produced from a known source.

In a first method to extract data representative of the interrelationship between sectors, a clock of the processor 63 is synchronised with data stored at the table of contents (TOC) on an original CD or master CD in reader 65. The disc under test is then placed in reader 60 and data representing sector position is extracted.

The time intervals between sectors or markers of the test disc are recorded. The timing information is compared with corresponding time intervals from stored information from a known source. If the disc under test is bona fide there will be no (or only minor) differences. However, if significant discrepancies between the two sets of timing information occurs then it is determined that the test disc is not derived from the known source and that they do not have common ancestors. So as to take account of extremely small discrepancies arising from thermal noise or drift discrepancies in timing, the information may be normalised. This depends on the extent of variation in measurement which arises due to Gaussian noise. A tolerance band is adopted. Discrepancies which fall outside the tolerance band are deemed to have been derived from a disc from a different source. Neural networks (not shown) may be taught to recognise such discrepancies.

In a second method, the apparatus in FIG. 7 is again used. A graphical representation of data from two CDs is obtained. The first CD is a master or from a known source, the second is a test disc. The two graphical representations, as in FIG. 8, are compared and it is apparent that the test disc has a different saw tooth frequency from that obtained from the known source whereby a difference in provenance is demonstrated. More accurate results may be obtained by arranging the computations to calculate a saw tooth pattern for each disc and comparing them automatically.

In a third method, data about the inter-sector or inter-marker or marker timing for particular CDs, is supplied on a data carrier and is input independently into the processor 63 where it is compared with data derived from a test disc.

In any of the methods described above, it is possible simply to check that the disc under test has all of the same physical characteristics as the known source. Preferably, however, data from the test disc and corresponding data from the known source are correlated to calculate their degree of similarity. This may be done by cross referencing the two sets of data, identifying common features, and then making a calculation using statistical methods of the probability of the common features occurring purely by chance. A calculation of the probability that the discs are from different manufacturings can be made. A certain probability is taken as the threshold above which the hypothesis will be accepted.

The statistical method used can be chosen as required. Currently Bayesian statistical methods are preferred.

It will be appreciated that variations in and modifications of the present invention may be made within the scope of this application as defined by the appended claims.

What is claimed is:

1. A method of determining the provenance of a data carrying disc, the method comprising the steps of:
   determining the physical characteristics of selected data recorded on a first, test disc,
   comparing the physical characteristics determined with the physical characteristics of the same data on a second, data carrying disc, the second disc originating from a known source,
   and utilizing the results of the comparison to determine whether the first disc has its provenance from the know source from which the second disc originates.

2. A method of determining the provenance of a data carrying disc according to claim 1, wherein the physical characteristics of each of the first and second discs which are determined are the locations of selected data on each said disc.

3. A method of determining the provenance of a data carrying disc according to claim 2, wherein the physical characteristics determined are angular orientation of specified sections of the data recorded on each said disc.

4. A method of determining the provenance of a data carrying disc according to claim 3, wherein the specified sections of the data recorded on said second disc from the know source lies substantially on a single radius of the disc.

5. A method of determining the provenance of a data carrying disc according to claim 2, wherein the selected data whose physical characteristics are determined on each of the first and second discs are selected frames of the data recorded on each said disc.

6. A method of determining the provenance of a data carrying disc according to claim 1, wherein the selected data whose physical characteristics are determined on each of the first and second discs are selected frames of the data recorded on each said disc.

7. A method of determining the provenance of a data carrying disc according to claim 6 or claim 5, wherein the selected frames of data are at evenly spaced radial positions on said second disc from the known source.

8. A method of determining the provenance of a data carrying disc according to claim 1, the method further comprising the steps of:
   extracting selected data from said first, test disc and determining the physical characterics thereof;
   at substantially the same time as the data is extracted from the first disc, extracting the same selected data from the second disc which, originates from a known source, and determining the physical characteristics thereof; and
   comparing in real time the physical characteristics determined from each of the first and second discs.

9. A method of determining the provenance of a data carrying disc according to claim 1, the method further comprising the steps of:
   extracting selected data from said second disc which originates from a known source and determining the physical characteristics thereof;
   recording the physical characteristics determined as a fingerprint of the known source; and
   comparing the physical characteristics determined from the first, test disc with said recorded fingerprint of the known source.

10. A method of determining the provenance of a data carrying disc according to claim 9, wherein the fingerprint is recorded in a hard copy format.

11. A method of determining the provenance of a data carrying disc according to claim 9, wherein the fingerprint is recorded by being stored in memory.

12. A method of determining the provenance of a data carrying disc according to claim 9, further comprising the steps of:
   rotating the first, test disc in a disc reader to extract data therefrom;
   determining a location in time of specified data which has been extracted from first disc;
   measuring the angular orientation on said first disc of said specified data; and
   comparing the time location determined and the angular orientation measured with the recorded fingerprint determined from the second disc.

13. A method of determining the provenance of a data carrying disc according to claim 12, wherein the disc reader has a motor for rotating the disc, and an encoder associated with the motor, and wherein the angular orientation is measured using said encoder.

14. A method of determining the provenance of a data carrying disc according to claim 12, wherein data is recorded onto the first disc according to CD standards with timing information recorded in the Q-subchannel, and wherein timing information Q-subchannel blocks is utilized both in determining the time location, and in measuring the angular orientation of the specified data.

15. A method of determining the provenance of a data carrying disc according to claim 1, wherein the physical characteristics of the first and second discs are determined by making physical measurements on said discs.

16. A method of determining the provenance of a data carrying disc according to claim 15, the method further comprising the steps of:
   rotating one of the first and seconds discs in a disc reader to extract data therefrom;
   determining a location in time of specified data which has been extracted from said disc; and
   measuring the angular orientation on said disc of said specified data.

17. A method of determining the provenance of a data carrying disc according to claim 16, wherein data is recorded onto the first and second discs according to CD standards with timing information recorded in the Q-subchannel and wherein timing information for Q-subchannel blocks is utilized both in determining the time location, and in measuring the angular orientation of the specified data.

18. A method of determining the provenance of a data carrying disc according to claim 16 or 17, wherein the disc reader has a motor for rotating the disc, and an encoder associated with the motor, and wherein the angular orientation is measured using said encoder.

19. A method of determining the provenance of a data carrying disc according to claim 1, wherein physical characteristics of said first disc are determined by extracting data from said disc and processing the data to determining the physical characteristics, the method further comprising the steps of:
   rotating a first disc in a disc reader to extract data therefrom;
   the disc reader having a pickup, and determining the time taken for the disc reader pickup to move between a reference location to specified data; and computing a location for the specified data from the time determined.

20. A method of determining the provenance of a data carrying disc according to claim 19, further comprising the step of utilizing positioning data read from said disc to enable determination of said physical characteristics.

21. Apparatus for enabling the provenance of a data carrying disc to be determined, said apparatus comprising:

determining means for determining the physical characteristics of selected data recorded on a first, test disc;

storage means for storing the physical characteristics of the same data on a second, data carrying disc, the second disc originating from a known source; and processor means for comparing the physical characteristics determined from the first disc with the physical characteristics of the same data from the second disc to determine whether the first disc has its provenance from said known source from which the second disc originates.

22. Apparatus for enabling the provenance of a data carrying disc to be determined according to claim 21, wherein said determining means for determining said physical characteristics of the first, test disc comprise:

means for rotating the first disc;

sensor means for generating pulses representative of the angular orientation of the first disc;

a pickup for extracting data from the rotating first disc; and circuit means for obtaining timing information for the extracted data.

23. Apparatus for enabling the provenance of a data carrying disc to be determined according to claim 22 wherein said means for rotating the first disc comprise an electric motor, and wherein said sensor means comprise an encoder associated with said motor.

24. Apparatus for enabling the provenance of a data carrying disc to be determined according to claim 23, wherein said encoder is an incremental shaft encoder mounted on a shaft of the motor.

25. Apparatus for enabling the provenance of a data carrying disc to be determined according to claim 22, wherein said pickup is a laser pickup;

and wherein said circuit means comprises a current to voltage converter receiving the current output of the laser pickup, a slicing circuit for generating an EFM digital signal, and a EFM decoder to decode the EFM digital signal into main and subcode channels.

26. Apparatus for enabling the provenance of a data carrying disc to be determined according to claim 22, wherein said physical characteristics determined comprise the relative angular orientations on the first disc of a number of specified frames of data.

27. Apparatus for enabling the provenance of a data carrying disc to be determined according to claim 21, wherein said determining means for determining said physical characteristics of the first, test disc comprise:

means for rotating the first disc;

a pickup for extracting data from the rotating first disc; and circuit means for determining the location of the extracted data on the first disc.

28. Apparatus for enabling the provenance of a data carrying disc to be determined according to claim 27, wherein said circuit means is arranged to measure the time taken to read specified data from the first disc, and to calculate the location of the data from the timing information.

29. Apparatus for enabling the provenance of a data carrying disc to be determined, said apparatus comprising:

determining means for determining the physical characteristics of selected data recorded on a first, test disc;

measuring means for determining the physical characteristics of the same data on a second, data carrying disc, the second disc originating from a known source; and processor means for comparing the physical characteristics determined from the first disc with the physical characteristics of the same data from the second disc to determine whether the first disc has its provenance from said know source from which the second disc originates.

30. Apparatus for enabling the provenance of a data carrying disc to be determined according to claim 29, wherein said determining means and said measuring means are distinct, and are operable substantially simultaneously, whereby the physical characteristics of the first and second discs are measurable at the same time such that a real time comparison of said physical characteristics can be made.

31. Apparatus for enabling the provenance of a data carrying disc to be determined, said apparatus comprising:

determining means for determining the physical characteristics for selected data recorded on a data carrying disc;

storage means for storing the physical characteristics determined for the selected data from a first, test disc, and the physical characteristics determined for the same data from a second disc, where the second disc originates from a known source; and processor means for comparing the physical characteristics determined from the first disc with the physical characteristics of the same data from the second disc to determine whether the first disc has it provenance from said known source from which the second disc originates.

32. Apparatus for enabling the provenance of a data carrying disc to be determined according to claim 31, wherein said determining means for determining the physical characteristics of a data carrying disc comprise:

means for rotating the disc;

sensor means for generating pulses representative of the angular orientation of the disc;

a pickup for extracting data from the rotating disc; and circuit means for obtaining timing information from the extracted data.

33. Apparatus for enabling the provenance of a data carrying disc to be determined according to claim 32, wherein said means for rotating the disc comprise an electric motor, and wherein said sensor means comprise an encoder associated with said motor.

34. Apparatus for enabling the provenance of a data carrying disc to be determined according to claim 33, wherein said encoder is an incremental shaft encoder mounted on a shaft of the motor.

35. Apparatus for enabling the provenance of a data carrying disc to be determined according to claim 32, wherein said pickup is a laser pickup;

and wherein said circuit means comprises a current to voltage converter receiving the current output of a laser pickup, a slicing circuit for generating an EFM digital signal, and a EFM decoder to decode the EFM digital signal into main and subcode channels.

36. Apparatus for enabling the provenance of a data carrying disc to be determined according to claim 32, wherein said physical characteristics determined comprise the relative angular orientations on the first disc of a number of specified frames of data.

37. Apparatus for enabling the provenance of a data carrying disc to be determined according to claim 31, wherein said determining means for determining the physical characteristics of a data carrying disc comprise:

means for rotating the disc;

a pickup for extracting data from the rotating disc; and circuit means for determining the location of the extracted data on the disc.

38. Apparatus for enabling the provenance of a data carrying disc to be determined according to claim 37, wherein said circuit means is arranged to measure the time taken to read specified data from the data carrying disc, and to calculate the location of the data from the timing information.

* * * * *